G. W. Pagett,
Cage Trap,
N°47,563.   Patented May 2, 1865.
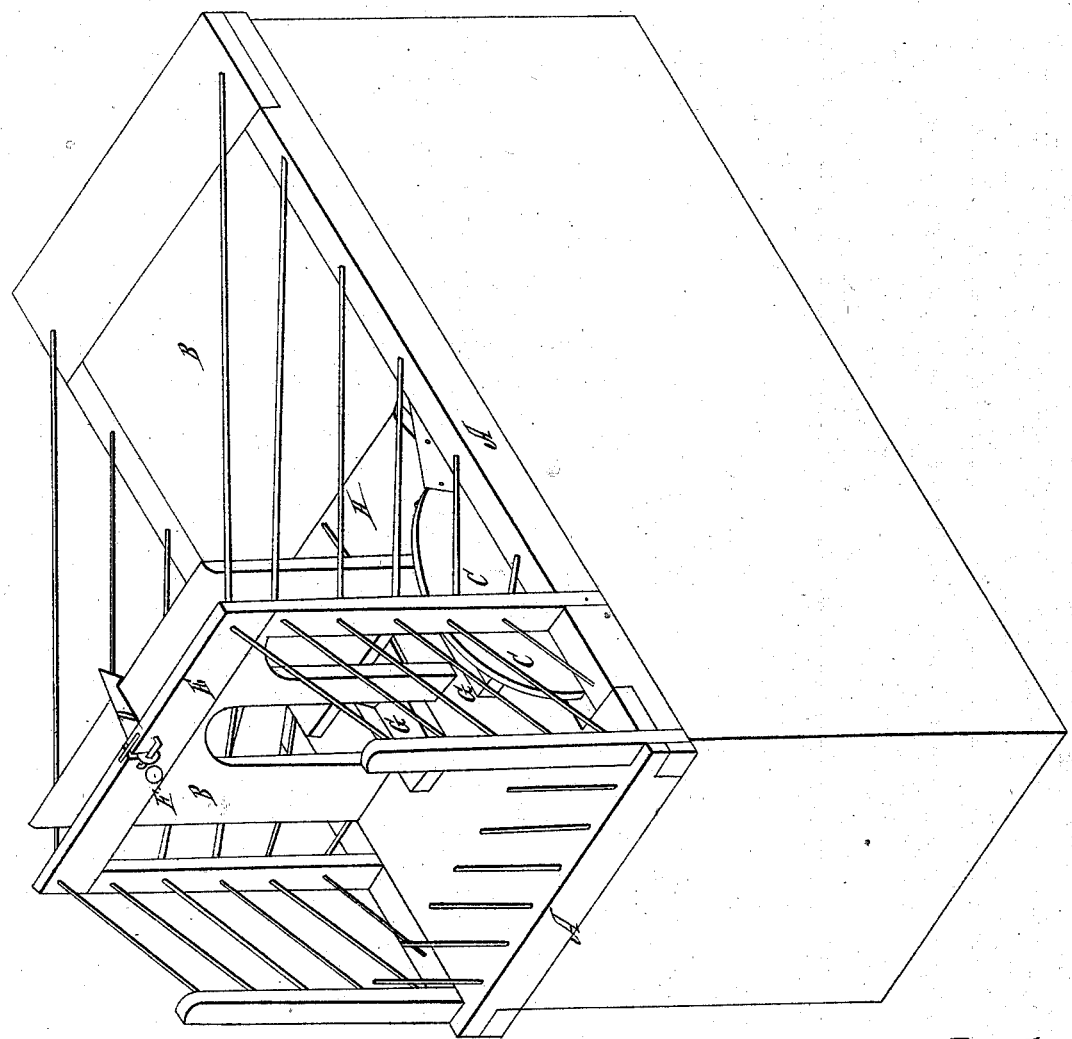

UNITED STATES PATENT OFFICE.

GEORGE W. PAGETT, OF ADAMS TOWNSHIP, HAMILTON COUNTY, INDIANA.

IMPROVEMENT IN ANIMAL-TRAPS.

Specification forming part of Letters Patent No. 47,563, dated May 2, 1865.

*To all whom it may concern:*

Be it known that I, GEORGE W. PAGETT, of Adams township, in the county of Hamilton and State of Indiana, have invented a new and useful Improvement in Traps for Catching Rats, Mice, and other Small Animals; and I do hereby declare that the following is a full, clear, and exact description of the construction and operation of the same, reference being had to the annexed drawing, making a part of this specification.

A is a base-frame made to any required dimensions, with wire fenders or their equivalents.

B B is a self-adjusting platform and head-board, made so by means of a pulley and weight C C, all combined and poised on a wire passing through the frame and the center of the pulley to the opposite side of the frame.

D is a catch hinged to an upright frame, E, and catches on the head-board.

F is a screw passing through the frame E, to regulate the position of the platform.

G G are bait-pans made fast to the base-frame at the rear of and passing through slots in the head-board to a proper point over the platform.

H is a self-adjusting lever-treadle poised on the platform at a proper distance from the bait to insure the rat to come in contact with the treadle before it gets in reach of the bait, thereby depressing the front of the treadle, raising an upright wire which is hinged to the rear end of the lever, and terminates directly under the catch, which is thereby thrown off, when the rat is at once precipitated into a box or barrel beneath, and so on alternately with every rat that approaches the bait.

What I claim as my invention, and pray to have secured by Letters Patent, is—

1. The combination of the catch and head-board, thereby holding a poised platform stationary until the treadle is depressed.

2. The stationary bait-pans, in combination with the self-adjusting lever-treadle, so arranged that the rat must come in contact with the treadle before it is in reach of the bait, consequently the platform falls leaving the bait untouched.

G. W. PAGETT.

Witnesses:
SOL. MAKER,
F. M. COLE.